June 1, 1971 — JEAN-PIERRE VERSPIEREN — 3,581,347

RING CLAMP

Filed March 4, 1970 — 5 Sheets-Sheet 1

INVENTOR
JEAN-PIERRE VERSPIEREN
BY Young & Thompson
ATTYS.

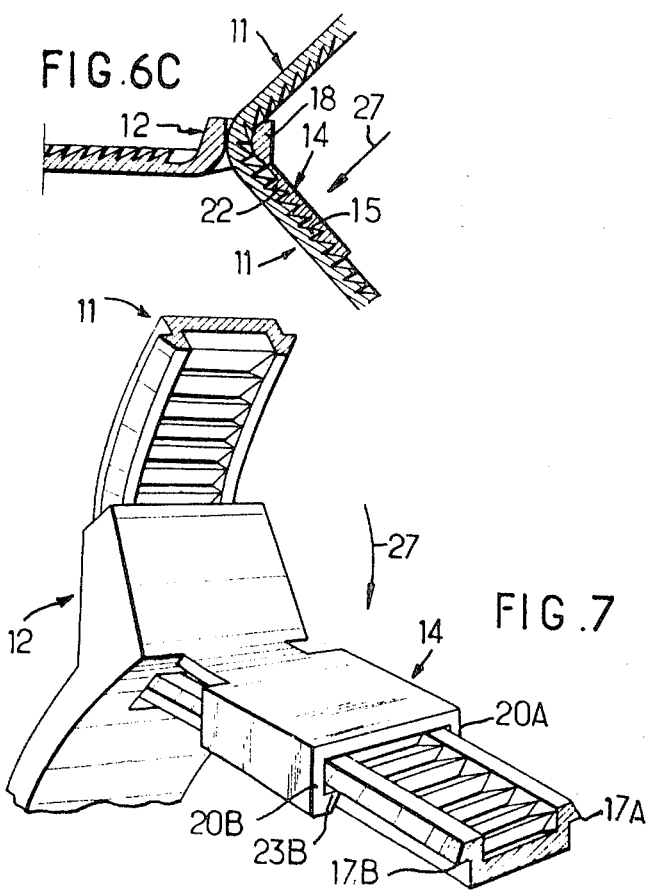

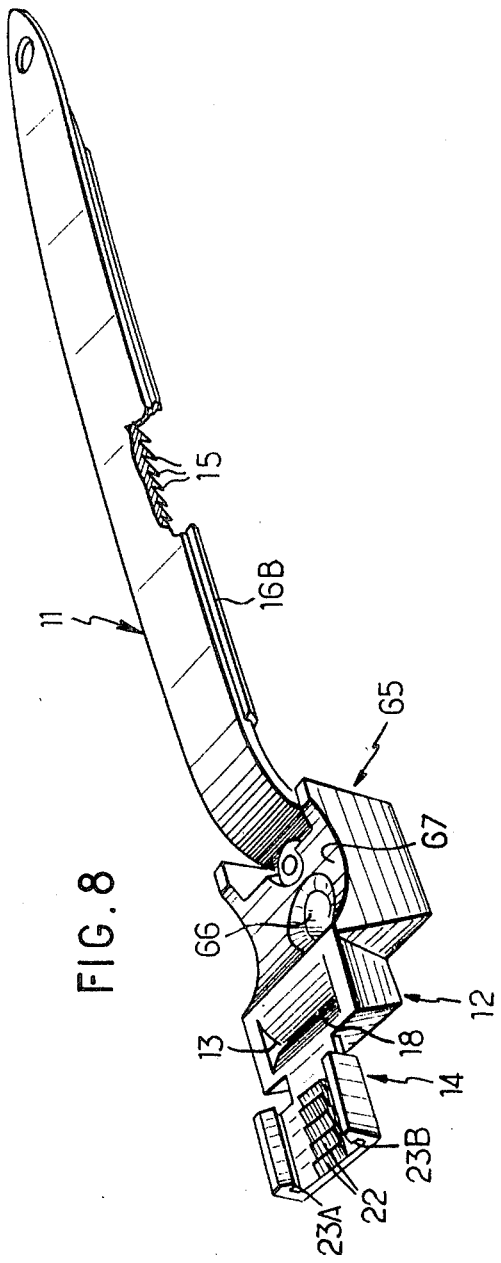

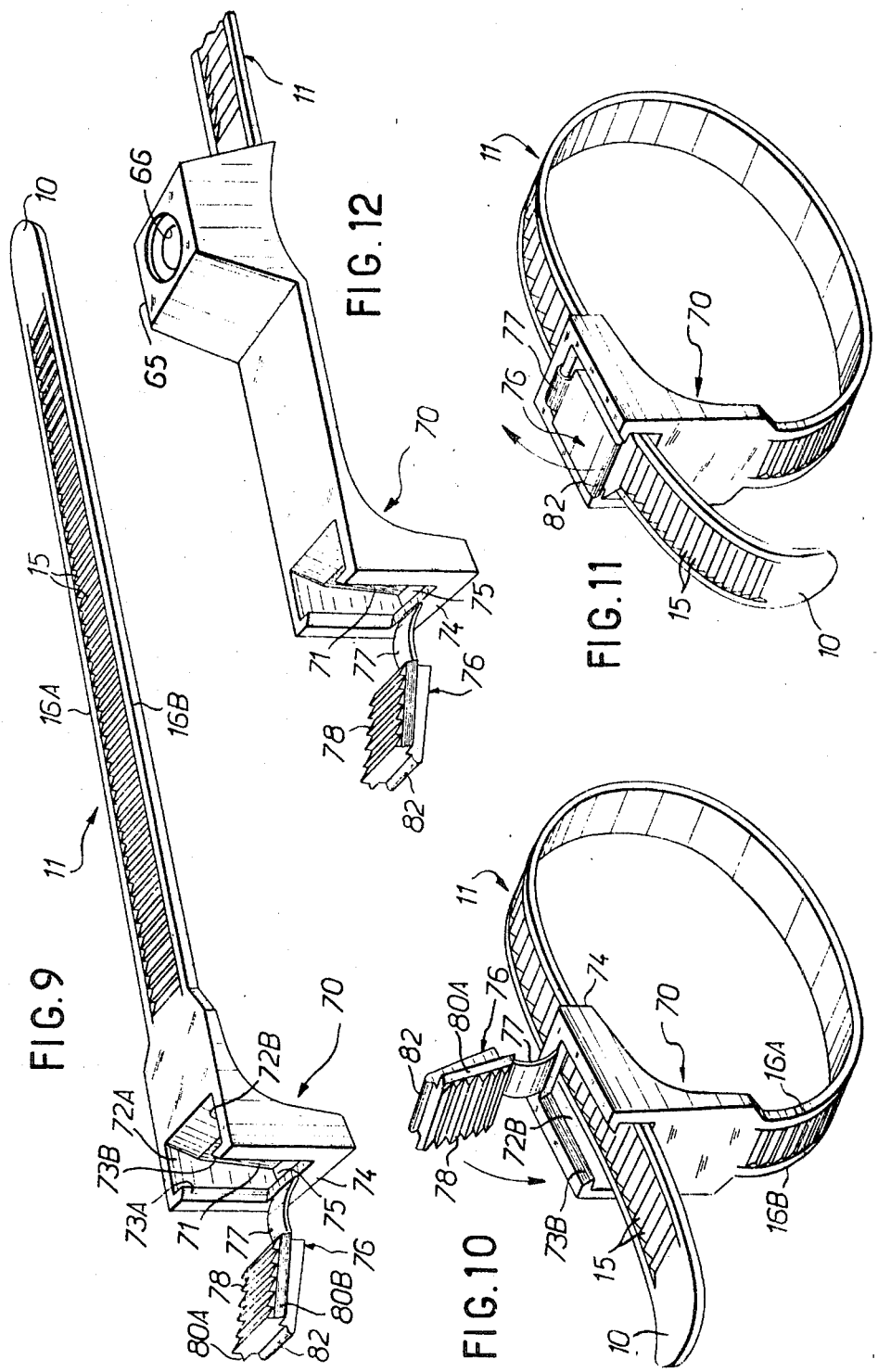

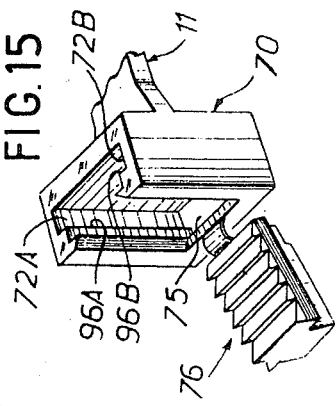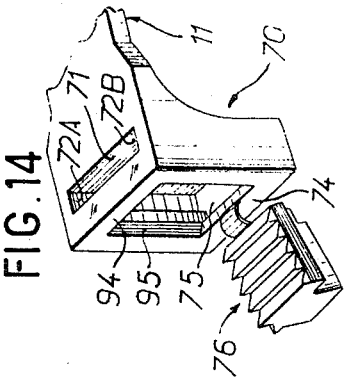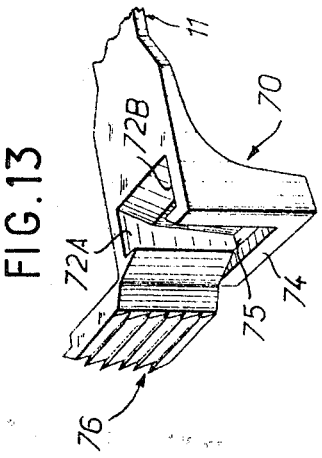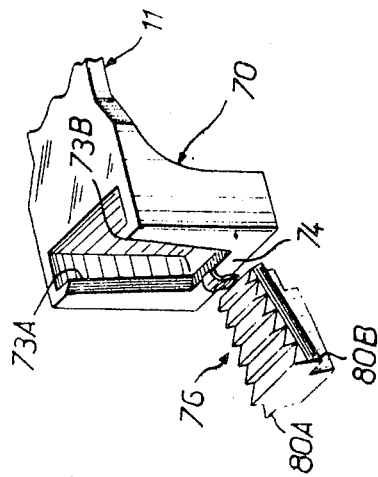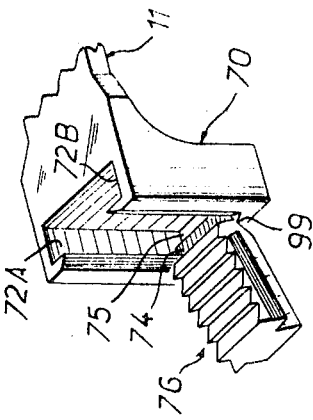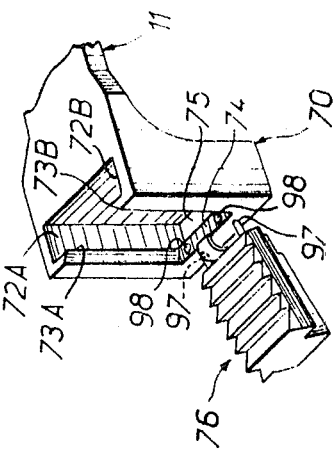

3,581,347
RING CLAMP
Jean-Pierre Verspieren, Limoges, France, assignor to Legrand S.A., Limoges, France
Filed Mar. 4, 1970, Ser. No. 16,323
Claims priority, application France, Mar. 7, 1969, 6,368; Jan. 15, 1970, 1,395
Int. Cl. B65d 63/00
U.S. Cl. 24—16
17 Claims

ABSTRACT OF THE DISCLOSURE

A ring clamp of one-piece construction is formed of plastics material and includes a flexible strap adapted to be secured in position in a fastening head. The fastening head is disposed at one end of the strap and a boss provided with a passage for receiving the strap is disposed adjacent to the fastening head. The fastening head is provided with a series of transverse ratchet teeth adapted for engagement with a series of ratchet teeth provided on the strap. Longitudinal securing teeth are provided on the fastening head for maintaining the ratchet teeth in engagement with one another. The boss includes a retaining member for aiding the tightening of the ring clamp before the ratchet teeth are in engagement. The ring formed when the ratchet teeth are in engagement can be opened by resiliently deflecting the securing teeth out of engagement with the strap. The ratchet teeth on the fastening head as well as another cooperating pair of securing teeth for engagement with the first pair of securing teeth may be provided on a flap hinged to the fastening head.

---

The present invention relates to ring clamps comprising an integral body formed of a synthetic plastics material including a flexible strap and a fastening head in which the strap is secured thereby forming a ring.

Accordingly, the flexible strap is provided with at least one series of transverse ratchet teeth and the associated fastening head is provided with at least one transverse ratchet tooth adapted for engagement with the any of the series of ratchet teeth.

In order to secure the strap in the fastening head thereby forming a ring, all that is necessary is that one or more of the ratchet teeth be brought into engagement with the ratchet tooth of the fastening head.

In order to further assure that the strap is secured in the fastening head some further teeth are brought into engagement with one another.

This securing is assured by providing a transverse passage in the fastening head or in a portion of the flexible strap formed integral therewith. The free end of the strap is secured in the passage. The teeth of the flexible strap are brought into engagement with the teeth of the fastening head at right angles to the passage.

Owning to the asymmetrical profile of the ratchet teeth, the passage allows the relative sliding of the flexible strap in the fastening head in a single direction of displacement corresponding to the decrease of the diameter of the ring formed by the flexible strap, but opposes a sliding of the strap in the opposite direction, however, by a movement transverse to the said displacement the teeth of the flexible strap are taken out of engagement with the teeth of the fastening head.

Ring clamps have been and continue to be very useful for connecting any two members, for example, for fixing an electrical conduit or tubing to a support. Such ring clamps however present a substantial disadvantage, i.e., once the two members are fixed together by such a ring clamp, it is very difficult or even impossible to take the members apart and even if the members are separated such an action most often results in rendering the ring clamp unusable.

An object of the present invention consists in providing a ring clamp which overcomes the abovementioned disadvantages.

A further object of the present ring clamp is the provision of means for tightening and adjusting the tension of the ring clamp.

The ring clamp according to the invention consists in a ring clamp including a flexible strap having a series of transverse ratchet teeth and a fastening head having at least one ratchet tooth adapted for engagement with any of the ratchet teeth on the strap to allow the tightening and to prevent the loosening of a ring formed by the engagement of the ratchet teeth, comprising a longitudinal securing tooth disposed on the fastening head adapted to be resiliently deflected into engagement with the strap for maintaining the ratchet teeth in engagement and a passage cooperating with the fastening head for receiving the strap when the ring is formed.

As in known devices, the transverse ratchet teeth effect a longitudinal blocking, i.e., in the direction of the extension and parallel to the plane of the flexible strap. In the present invention, the longitudinal securing teeth act transversely, i.e., perpendicular to the plane of the flexible strap.

Further, the securing teeth are resiliently snapped into position when the ring clamp is in its closed position and effectively maintain the flexible strap in engagement with the ratchet teeth of the fastening head.

If it is desired to open the ring clamp, i.e., disengage and then disconnect the flexible strap from the fastening head, it is again merely necessary to resiliently deflect or snap the flexible strap out of engagement with the securing teeth of the fastening head.

This resilient deflection or snapping is easily effected; further, it leaves the ring clamp in tact and ready for any eventual use.

Use of this feature according to the invention can be made in a numerous variety of diverse embodiments.

A further feature of the clamp ring according to the invention is the passage in which the flexible strap is engaged. Preferably, the passage is provided with a retaining member and is offset longitudinally from the ratchet tooth or teeth of the fastening head.

The passage therefore does not contribute to the securing of the flexible strap but functions in the manner described hereinabove.

On the other hand the retaining member is a complementary feature according to the invention in that it facilitates the tightening of the flexible strap before the closing of the ring clamp round one or more members as well as opposing any undesired movement of the flexible strap once it has been tightened but before it has been secured in position in the direction tending to loosen the strap.

Preferably, the passage includes a retaining member for preventing the loosening of the ring to enable the ring to be tightened before the ratchet teeth are in engagement.

Preferably, the fastening head includes a wall having a pair of longitudinal flanges along the sides thereof, a securing tooth is provided on each of the pair of flanges, and wherein a pair of cooperable longitudinal securing teeth are provided on the strap.

According to a preferred embodiment, the fastening head further includes an articulated flap which supports the said securing tooth and a further securing tooth for engagement with the said securing tooth to maintain the ratchet teeth in engagement.

Further features and advantages of the invention will be brought out in the description which follows of various embodiments according to the invention, made merely by way of example with reference to the acocmpanying drawings wherein:

FIGS. 6A, 6B, 6C are a series of enlarged views partially in longitudinal section illustrating stages in the tightening and securing of a ring clamp according to the invention;

FIG. 7 is an enlarged view of a portion of the clamp ring according to the invention in its secured position;

FIG. 8 is a perspective view with a cutaway portion showing another embodiment according to the invention;

FIG. 9 is a perspective view of a further embodiment of a ring clamp according to the invention;

FIGS. 10 and 11 are perspective views illustrating successive stages in the utilization of the embodiment shown in FIG. 9;

FIG. 12 is a fragmentary view in perspective illustrating a modification of the embodiment of FIG. 9;

FIGS. 13 to 18 are fragmentary views of clamp rings according to the invention illustrating various modifications of the "flap" feature thereof.

Figure 1:
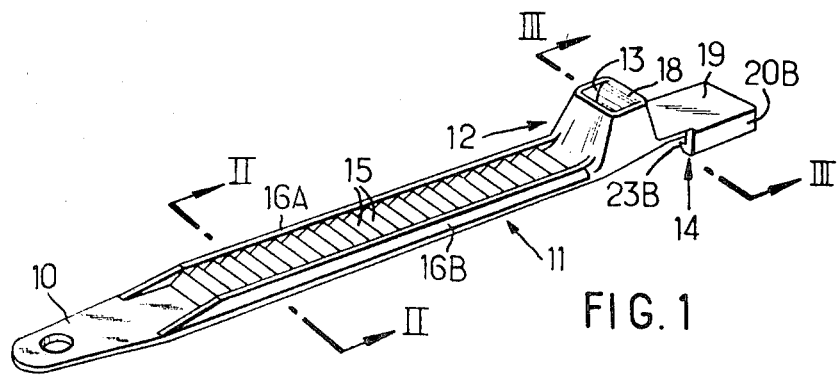
FIG. 1 is a perspective view of a ring clamp according to the invention.
Figure 2:
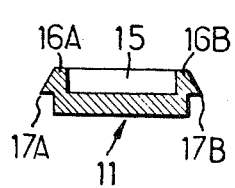
FIGS. 2 and 3 are cross-sections of the ring clamp shown in FIG. 1 taken along lines II—II and III—III respectively of FIG. 1.
Figure 3:
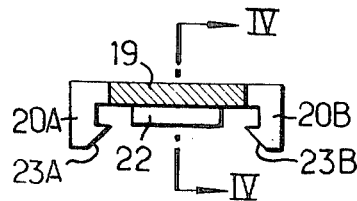
Figure 4:
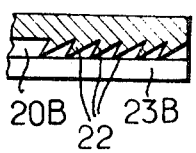
FIG. 4 is a longitudinal section of the ring clamp taken along the line IV—IV of FIG. 3.
Figure 5:
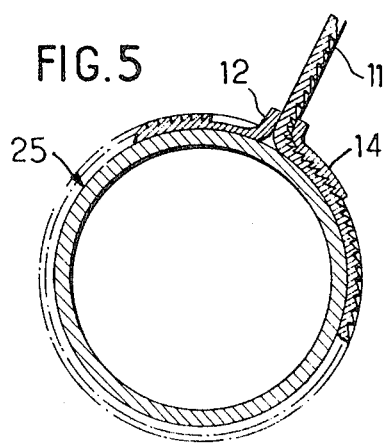
FIG. 5 is a view partially in section of a clamp ring shown in FIG. 1 in position round a conduit.

Referring to the embodiment illustrated in FIGS. 1 to 7 a clamp ring according to the invention comprises from one of its ends to its other end a holding tab 10, a flexible strap 11, a boss 12 having an axial passage 13 extending therethrough and a fastening head 14.

The strap 11, which extends longitudinally, includes a series of transverse ratchet teeth 15 extending from the same side of the strap 11 as does the boss 12. The ratchet teeth extend between two longitudinal flanges 16A and 16B of the same height.

The longitudinal securing teeth 17A and 17B extend along the outer surfaces of the flanges 16A and 16B.

One of the transverse jaws of the boss 12, in particular, the one which is remote from the strap 11, forms a retaining member 18 whose function will be described hereinafter.

The fastening head 14 comprises a wall 19 which is effectively an extension of the strap 11 and two lateral flanges 20A and 20B extending from the side of the wall 19 opposite the side from which extends the boss 12 and the ratchet teeth of the strap 11. The flanges 20A and 20B are parallel to one another and spaced apart a distance greater than the width of the strap 11.

The wall 19 of the fastening head 14 carries a series of transverse ratchet teeth between the flanges 20A and 20B adapted to engage the ratchet teeth 15 of the strap 11.

The flanges 20A and 20B support at their free ends longitudinal securing teeth 23A and 23B respectively. The teeth 23A and 23B are parallel to the wall 19 and spaced therefrom a distance slightly greater than the height of the flanges 16A and 16B on the strap 11.

In order to close the ring clamp hereinabove described about a cylindrical member 25, for example, is as follows: the holding tab 10 is passed through the passage 13 in the boss 12 and the tab 10 is pulled in the direction as indicated by the arrow 26 in FIG. 6B to tighten the strap 11 round the cylindrical member 25.

The tightening of the clamp ring is effected obliquely to the horizontal plane of the strap 11 from the side of the fastening head 14 as shown in FIG. 6B. The side of the strap 11 from which the ratchet teeth 15 extend is pulled around the retaining member 18 of the boss 12 so that if during tightening the pulling force is momentarily released the retaining bar acts to prevent the return of the strap 10 in the direction opposite to the effective direction of the pulling.

Preferably as shown, the retaining member 18 has a rounded profile which facilitates the support of the strap 12 on the bar and increases the contact surface therebetween and consequently tends to better prevent the return of the strap.

According to a modification not shown in the drawings, the retaining member 18 is provided with retaining teeth which further tend to maintain the position of the strap 11.

Returning again to the operation of the present embodiment, when the strap 11 has been sufficiently tightened about the cylindrical member 25, the fastening head is turned down into position in the direction indicated by arrow 27 in FIGS. 6C and 7. The force exerted on the fastening head indicated by the arrow 27 is continued until the securing teeth 23A and 23B of the fastening head 14 are resiliently deflected along the flanks of the corresponding teeth 17A and 17B of the strap 11 and clicked into position along the undersurface thereof.

By the above-described action, the fastening head 14 is secured onto the strap 11 and thus prevents the transverse movement of the strap 11 out of the plane in which it is in engagement.

Simultaneously, the transverse ratchet teeth 22 of the fastening head 14 are moved into engagement with the transverse teeth 15 of the strap 11 (see FIG. 6C) which prevent any longitudinal movement of the strap 11 relative to the head 14.

The ring clamp is thus maintained in its tightened position round the cylindrical member 25.

If desired, the portion of the strap 11, which extends beyond the boss 12, may be cut off at the level of the top of the boss.

In order to open the ring clamp, a force must be exerted on the fastening head 14 in a direction opposite to that indicated by the arrow 27 in the FIG. 6C, for example, by inserting the end of a screw driver between the wall 19 of fastening head and the strap 11. This action is continued until the securing teeth 23A and 23B of the fastening head are resiliently released from engagement with the cooperating securing teeth 17A and 17B of the strap 11.

FIG. 8 shows an alternative embodiment wherein the ring clamp includes a base portion 65 which can be fixed to any desired support, accordingly, the base portion 65 is provided with an axial passage 66 which is adapted to receive securing means for example a screw.

The upper face 67 of the base portion is preferably concave in order to better cooperate with a cylindrical member that is to be positioned thereon.

In this embodiment, the fastening head 14 includes two longitudinal securing teeth which are adapted to cooperate with the edges of the flexible strap 11 in order to secure the strap in the fastening head.

Reference will now be made to FIGS. 9 to 18 relative to the description of the alternative embodiments and modifications wherein the securing is effected by an articulated element or flap provided on the fastening head.

In FIG. 9 a ring clamp formed as an integral body comprises from one end to the other a holding tab 10, a flexible strap 11 and a relatively-rigid fastening head 70.

The strap includes along one of its sides a series of transverse ratchet teeth 15 which extend between two longitudinal flanges 16A and 16B of the same height.

The fastening head 70 comprises a wall 71 which forms an extension of the flexible strap 11, but which in the instant embodiment forms an elbow with the flexible strap 11. A pair of lateral flanges 72A and 72B extends from the wall 71 parallel to one another at a distance slightly greater than the width of the strap 11.

A pair of securing teeth 73A and 73B extends from the flanges 72A and 72B, towards one another and parallel to the wall 71.

The ends of the flanges 72A and 72B of the fastening head 70 remote from the strap 11 are connected to one another by a transverse retaining member or bar 74 which in cooperation with the flanges of the wall 71 forms a passage 75 which is adapted to receive the strap 11.

In this embodiment a fastening flap 76 is articulately connected to the retaining bar by a flexible tongue 77. The combination of the fastening flap 76, the fastening head 70 and the strap assembly forms an integral body.

The flap 76 carries transverse ratchet teeth 78 on the face thereon which faces the wall 71 which are adapted to engage the transverse ratchet teeth 15 of the strap 11. The flap 76 further includes two longitudinal securing teeth 80A and 80B which are adapted to cooperate with the longitudinal securing teeth 73A and 73B of the fastening head 70 and a transverse elongated tab 82 disposed at the end remote from the tongue 77, the function of the tab will be described hereinafter.

The manner of operation of the ring clamp shown in FIG. 9 will be described with reference to FIGS. 10 and 11 illustrating same.

First, the strap 11 is engaged in the passage thus forming a ring which can then be tightened to fix one or more objects therein. Once the tightening is carried out, the fastening flap 70 is brought into the position shown in FIG. 11 by exerting a force in the direction indicated by the arrow in FIG. 10 until the securing teeth 80A and 80B are resiliently deflected and snapped into engagement with the teeth 73A and 73B of the fastening head. Concurrently, the transverse ratchet teeth 78 of the flap 76 come into engagement with the transverse ratchet teeth 15 of the strap 11. Once in position the cooperating ratchet teeth prevent any longitudinal movement of the strap relative to the fastening head in the loosening direction.

In order to open the ring and thereby release the strap 11, the fastening flap 76 need only be moved out of engagement with the fastening head 70. This operation is facilitated by the flap 82 against which a force is directed in the direction indicated by the arrow in FIG. 11 and preferably by means of any suitable tool.

FIG. 12 shows a modification of the previous embodiment wherein the ring clamp is provided with a base portion 65 having an aperture 66 so that the ring clamp can be fixed to a support for example by a screw.

Referring to the modification shown in FIG. 13, the fastening flap 76 is hinged to one of the flanges, for example the flange 72A, by a portion of reduced cross-section disposed therebetween, and is adapted to be secured into position by means of the tooth adapted to cooperate with the tooth on the other flange 72B. According to such a modification the retaining member 74 may not be necessary.

The other modifications shown in FIGS. 14 to 18 concern as did the preceding embodiment the hinging of the flap 76 on the bar 74.

In FIG. 14 the flanges 72A and 72B are connected together by a second transverse bar 74, and an opening 95 disposed in a plane parallel to that of the wall 71 in order to better maintain the flap 76 longitudinally once it has been closed.

In FIG. 15 the flanges 72A and 72B are provided with longitudinal shoulders 96A and 96B which are adapted to guide the associated flexible strap 11.

In FIG. 16, the flap 76 carries two pegs for cooperating with blind holes 98 disposed in the bar 74 parallel to the securing teeth 73A and 73B on the flanges 72A and 72B. Such a mounting better assures the maintainance of the flap 76 in its closed position against an undesired force tending to move the flap to its open position. The pegs 97 could of course be disposed on the retaining member and the blind hole on the flap 76.

In FIG. 17, the hinge for the flap 76 is a portion of reduced cross-section 99. This feature eliminates all longitudinal play of the flap 76 once the flap is in its closed position.

Finally, in FIG. 18, the longitudinal securing teeth 73A and 73B of the fastening head converge in the direction of the bar 74 as well as do the longitudinal securing teeth 80A and 80B of the flap 76. This feature facilitates the resilient engagement of the flap 76 by the longitudinal securing teeth of the fastening head as well as opposing longitudinal movement of the flap 76 once the flap is in its closed position.

The invention is of course not limited to the embodiments and modifications described and shown herein but also includes all manners of carrying out the invention. In particular, according to another modification (not shown) which could however be used with the embodiments of FIGS. 9 to 18 hereinabove described, the transverse ratchet teeth 78 can be carried by the wall 71 of the fastening head instead of by the flap 76 which in this case is provided with a smooth surface instead of the ratchet teeth. With such a modification it is evident that the other side of the strap 11 will carry the transverse ratchet teeth 15.

I claim:

1. A ring clamp of the type including a flexible strap having a plurality of transverse ratchet teeth and a fastening head having at least one ratchet tooth adapted for engagement with any of the ratchet teeth on the strap to allow the tightening and to prevent the loosening of a ring formed by the engagement of the ratchet teeth comprising: longitudinal securing tooth means disposed on the fastening head adapted to be resiliently deflected into engagement with the strap for maintaining the ratchet teeth in engagement and means forming a passage disposed adjacent to the fastening head, whereby the strap is passed through the passage in order to tighten the ring.

2. A ring clamp as claimed in claim 1, wherein the means forming the passage includes a retaining member for enabling the ring to be tightened before the ratchet teeth are in engagement.

3. A ring clamp as claimed in claim 1, wherein the means forming the passage is disposed between the strap and the fastening head.

4. A ring clamp as claimed in claim 1, wherein the fastening head includes a wall having a pair of longitudinal flanges along the sides thereof, said securing tooth means comprising a securing tooth carried on each of the pair of flanges, and wherein a pair of cooperable longitudinal securing teeth are provided on the strap.

5. A ring clamp as claimed in claim 4, further comprising shoulders disposed on the flanges on the fastening head for guiding the flexible strap through the passage.

6. A ring clamp as claimed in claim 1, wherein the fastening head further includes an articulated flap which supports said securing tooth means and further securing tooth means being provided for engagement with the said securing tooth means to maintain the ratchet teeth in engagement.

7. A ring clamp as claimed in claim 6, wherein the transverse ratchet teeth of the fastening head are also disposed on the said flap.

8. A ring clamp as claimed in claim 6, wherein the fastening head includes a wall having a pair of longitudinal flanges and a transverse retaining member connected between the flanges, the said means forming the passage includes the retaining member, the flanges and the wall, and wherein the flap is hinged on the retaining member.

9. A ring clamp as claimed in claim 8, wherein a second retaining member is connected between the flanges on the fastening head and arranged so that an aperture is formed between the retaining members and parallel to the said wall adapted for receiving the said flap.

10. A ring clamp as claimed in claim 8, wherein the longitudinal securing tooth means on the fastening head and on the flap of the fastening head converge towards the retaining member.

11. A ring clamp as claimed in claim 6, wherein the fastening head includes a wall having a pair of longitudinal flanges, one of the flanges carrying said securing tooth means, and wherein the flap is hinged on the other of the flanges and includes further securing tooth means being adapted to cooperate with the said securing tooth means for maintaining the ratchet teeth in engagement.

12. A ring clamp as claimed in claim 11, wherein a retaining member is connected between the flanges on the fastening head, and wherein the said means forming the passage includes the retaining member, the flanges and the wall.

13. A ring clamp as claimed in claim 6, further comprising a hinge for articulating the flap, and wherein the hinge, the flap and the rest of the fastening head are integrally formed.

14. A ring clamp as claimed in claim 6, wherein the flap includes a tab for opening and closing the flap in the fastening head.

15. A ring clamp as claimed in claim 6, further comprising means for fixing the one of the elements including the flap and the fastening head relative to the other of the elements including pegs disposed in one of the elements and blind holes provided in the other of the elements.

16. A ring clamp as claimed in claim 1, wherein the wall of the fastening head forms an elbow with the end of the flexible strap adjacent thereto.

17. A ring clamp as claimed in claim 1, further comprising a base portion adapted to receive a securing member for securing the ring clamp to a support.

References Cited

UNITED STATES PATENTS

| | | | |
|---|---|---|---|
| 3,049,771 | 8/1962 | Litwin et al. | 248—71X |
| 3,214,808 | 11/1965 | Litwin | 24—16PB |
| 3,513,508 | 5/1970 | Modémé | 24—16PB |

DONALD A. GRIFFIN, Primary Examiner

U.S. Cl. X.R.

248—74PB